United States Patent Office 3,428,573
Patented Feb. 18, 1969

3,428,573
OXIDATION CATALYSTS
Ronald E. Reitmeier, Middletown, Ky., and Daniel A. Hirschler, Jr., Birmingham, and Frances W. Lamb and Ruth E. Stephens, Detroit, Mich., assignors to Ethyl Corporation, New York, N.Y., a corporation of Virginia and Catalysts and Chemicals, Inc., Louisville, Ky., a corporation of Delaware
No Drawing. Filed June 1, 1965, Ser. No. 460,535
U.S. Cl. 252—455                                    21 Claims
Int. Cl. B01j 11/16

ABSTRACT OF THE DISCLOSURE

Exhaust gas of internal combustion engines is oxidized by contact with a catalyst containing copper oxide and palladium on a three-component support made by acid peptization of a mixture of clay, alumina gel and crystalline alumina hydrate, followed by extrusion, drying and calcination.

---

This invention relates to novel oxidation catalysts and to methods for preparing them. Moreover, it relates to a novel method for the oxidation of hydrocarbons and carbon monoxide constituents of the exhaust gases produced by internal combustion engines.

Atmospheric pollution has of recent years become a critical problem in many areas. Certain atmospheric contaminants have been found to be injurious to plant life. According to recent estimates, the plant damage due to atmospheric contaminants in twenty-six California counties amounts to about ten million dollars annually. Furthermore, atmospheric contaminants are also injurious to human health. For example, carbon monoxide is extremely toxic and in high concentrations can cause death. Many authorities have stated that atmospheric contaminants contribute to the rising incidence of respiratory disease.

Certain types of atmospheric contaminants are potent eye irritants. Contaminants that cause eye irritation are formed by a series of chemical reactions involving sunlight, air, oxides of nitrogen and hydrocarbons. Nitrogen dioxide is a minor constituent of automobile exhaust. Nitrogen dioxide in the presence of sunlight forms nitrous oxide plus nascent oxygen. Nascent oxygen reacts with atmospheric oxygen to form ozone. Ozone in turn reacts with olefinic hydrocarbons present in the atmosphere to form aldehyde compounds which have eye-irritating properties.

Furthermore, certain radicals formed by the ozonalysis of olefins in the atmosphere can react with atmospheric oxygen and nitrogen dioxide to form preoxyacyl nitrates. These substances cause eye irritation and plant damage. In summary, the combination of sunlight, nitrogen dioxide, hydrocarbons, and air can lead to the "smog" presently encountered in certain areas, notably Los Angeles. Removing any one of the foregoing required components will obviate the formation of the deleterious reaction products and the formation of smog.

There are several sources of hydrocarbons in the atmosphere. One source is the crankcase vent on the automobile engine. The gases which evolve from the crankcase vent originate from piston blow-by. Another source of hydrocarbon and carbon monoxide contamination is automobile exhaust.

Many factors contribute to the presence of unburned hydrocarbons in automobile exhaust. First of all, there is the quenching of normal combustion near the cool cylinder wall of the engine. Another cause is that during low speed operation, the combustion temperature in the engine is too low to cause complete combustion of the hydrocarbons. A third cause is the low manifold pressure encountered during deceleration. A further cause is that an automobile operates under oxygen deficient conditions much of the time. Other causes (encountered mainly in older automobiles) are faulty carburetion, ignition, and exhaust valve leaks.

Several methods have been devised in attempts to reduce the hydrocarbon and carbon monoxide content of the atmosphere. Crankcase breathing devices have been installed on cars to recycle crankcase vent gas through the carburetion system. These devices eliminate contamination from the crankcase vent, but do not reduce the hydrocarbon and carbon monoxide content of the exhaust gas. Another goal of recent research has been the oxidation of the unburned constituents of the exhaust gas. One type of device utilizes a flame in the exhaust system to accomplish this oxidation. A second and more fruitful method of oxidizing the unburned constituents of exhaust gases has been the catalytic oxidation of these constituents. In this method, the exhaust gas, together with atmospheric oxygen, is passed through a bed of a suitable exhaust catalyst which converts the incomplete products of combustion present in the exhaust gas to products of complete combustion such as carbon dioxide and water.

Many obstacles must be overcome in the development of a suitable exhaust catalyst. The catalyst must be active at temperatures as low as about 500° F., yet it must be able to withstand temperatures as high as about 1700° F. It must be capable of catalyzing the oxidation of both hydrocarbons and carbon monoxide. It must operate under conditions that in most cases lead to rapid deactivation of the catalyst. Present in the exhaust gas of the automobile engine are many products known to be catalyst poisons. A few of these are the combustion products of sulfur, halogens, phosphorus, barium, zinc and boron. Many catalysts have been tried only to falter on one or more of the aforementioned obstacles.

For some years, many research groups have, at the urging of urban areas such as Los Angeles, devoted much effort and expended large sums of money in attempts to discover a catalyst suitable for use in an automobile exhaust system. This invention provides catalysts which are admirably suited for the oxidation of automobile exhaust gases and processes for making them.

An object of this invention is to provide a novel catalyst which is especially suitable for the oxidation of unburned constituents in the exhaust gas of internal combustion engines. Another object is to provide a catalyst that is resistant to catalytic poisons present in exhaust gas. A further object is to provide a catalyst that will maintain its integrity when subject to the high temperature and abrasive action encountered in an automobile exhaust system. A still further object of this invention is to provide a catalyst having activity at low temperatures. Another object of the present invention is to provide a method of preparing novel catalysts which promote the oxidation of unburned constituents in exhaust gas. Another object of this invention is to provide a method of oxidizing constituents of exhaust gas. A still further object is to provide an automobile exhaust system wherein exhaust gas and oxygen are contacted with a catalyst which promotes the oxidation of oxidizable components of exhaust gas. Other objects will be apparent from the following detailed description and appended claims.

The objects of this invention are satisfied by providing a catalyst comprising copper oxide and palladium on an alumina-clay support. The objects of the present invention are further satisfied by providing a catalyst which promotes the oxidation of unburned constituents of the exhaust gas of internal combustion engines, said catalyst comprising a support consisting essentially of a calcined mixture of clay, alumina gel and crystalline alumina hydrate, said support being impregnated with from about 0.25 to about 15 weight percent copper in an oxide form and from about 0.01 to about 0.3 weight percent palladium.

Other objects of the present invention are satisfied by providing a method for manufacturing a catalyst containing copper oxide and palladium on an alumina-clay support. This object is further satisfied by providing a process of preparing an extruded catalyst comprising copper oxide, palladium, alumina and clay, said process comprising the steps of mixing together clay, alumina gel and crystalline alumina hydrate, in such quantities that the mixture consists, on a calcined basis, of from 5 to 30 weight percent clay, from 30 to 70 weight percent alumina gel and the balance, crystalline alumina hydrate; adding a copper compound, said compound being decomposable to copper oxide on heating; and a palladium compound, in such quantities that the final catalyst contains from 0.25 to 15 weight percent copper in an oxide form and from 0.01 to 0.3 weight percent palladium; adding acid to plasticize the mixture; forming the plastic mass into a desired catalyst shape, and calcining the shaped catalyst.

Further objects of the present invention are satisfied by providing a method of oxidizing a substantial portion of the hydrocarbon and carbon monoxide constituents of the exhaust gas of an internal combustion engine which comprises contacting said exhaust gas and oxygen with a catalyst; said catalyst comprising a calcined clay-alumina support impregnated with copper in an oxide form and palladium. Still further objects of this invention are satisfied by providing a muffler incorporated in the exhaust system of an internal combustion engine, said muffler containing a catalyst especially adapted to substantially oxidize the unburned constituents of the exhaust gas, said catalyst comprising a support consisting essentially of a calcined mixture of clay, alumina gel and crystalline alumina hydrate, and from about 0.25 to about 15 weight percent copper in an oxide form and from 0.01 to 0.3 weight percent palladium.

A preferred embodiment of the novel catalyst of the present invention is a catalyst especially adapted to substantially oxidize the unburned constituents of the exhaust gas of internal combustion engines, said catalyst comprising:

(1) A support consisting, on a calcined basis, essentially of a calcined mixture of from about 5 to about 30 weight percent clay, about 30 to about 70 weight percent alumina gel and the balance, crystalline alumina hydrate, (2) From about 0.25 to about 15 weight percent copper in an oxide form, and (3) From about 0.01 to about 0.3 weight percent palladium.

A more preferred embodiment of the novel catalyst of this invention is an exhaust gas catalyst comprising:

(1) An extruded support having a surface area greater than 75 m.$^2$/g. consisting, on a calcined basis, essentially of a calcined mixture of from about 5 to about 30 weight percent clay, about 30 to about 70 weight percent alumina gel and the balance, crystalline alumina hydrate, (2) From about 0.5 to about 15 weight percent copper in an oxide form, and (3) From about 0.01 to about 0.3 weight percent palladium.

A most preferred embodiment of the present invention is a catalyst comprising:

(1) An extruded support having a surface area greater than 75 m.$^2$/g. consisting, on a calcined basis, essentially of a calcined mixture of from about 8 to about 25 weight percent kaolin, about 40 to about 60 weight percent alumina gel and the balance, crystalline alumina hydrate, (2) From about 0.5 to about 7 weight percent copper in an oxide form, and (3) From about 0.01 to about 0.2 weight percent palladium.

A preferred embodiment of the process of preparing the novel catalyst of this invention is a process comprising the steps of:

(1) Mixing together, in the dry state, clay, crystalline alumina hydrate and alumina gel, in quantities such that the mixture comprises, on a calcined basis, from about 5 to about 30 weight percent clay, from about 30 to about 70 weight percent alumina gel and the balance, crystalline alumina hydrate, (2) Adding an amount of water sufficient to wet the mixture, (3) Adding sufficient nitric acid to form a plastic mass, (4) Extruding said plastic mass, (5) Drying the extrudate, (6) Calcining the extrudate, (7) Impregnating said calcined extrudate with a copper compound in quantities such that the final catalyst contains from 0.25 to 15 weight percent copper in an oxide form, said copper compound being decomposable to copper oxide on heating, (8) Calcining the copper impregnated extrudate, (9) Further impregnating the calcined copper impregnated extrudate with palladium in quantities such that the final catalyst contains from 0.01 to 0.3 weight percent palladium and

(10) Drying the copper oxide-palladium impregnated catalyst.

In a more preferred embodiment of the process of the present invention the alumina-clay mixture of Step 1 consists essentially of a mixture of clay, crystalline alumina hydrate and alumina gel in quantities such that the mixture comprises, on a calcined basis, from about 8 to about 25 weight percent clay, from about 40 to about 60 weight percent alumina gel and the balance, crystalline alumina hydrate. A most preferred embodiment of the present invention is a process of preparing an extruded copper oxide-palladium catalyst comprising the steps of:

(1) Mixing together, in the dry state, kaolin, crystalline alumina hydrate and alumina gel, in quantities such that the mixture comprises, on a calcined basis, from about 8 to about 25 weight percent kaolin, from about 40 to about 60 weight percent alumina gel and the balance, crystalline alumina hydrate, (2) Adding an amount of water sufficient to wet the mixture, (3) Adding sufficient nitric acid to form a plastic doughy mass, (4) Extruding said plastic doughy mass, (5) Drying the extrudate at a temperature of 200 to 400° F., (6) Calcining the extrudate at a temperature of from 300 to 1000° F., (7) Impregnating said calcined extrudate with an aqueous solution of copper ammonium carbonate in quantities such that the final catalyst contains from 0.5 to 7 weight percent copper, (8) Calcining the copper impregnated extrudate at 300 to 1000° F., (9) Further impregnating the calcined copper impregnated extrudate with an aqueous solution of palladium chloride in quantities such that the final catalyst contains from 0.01 to 0.2 weight percent palladium, and

(10) Drying the copper oxide-palladium impregnated catalyst.

Before discussing the process of preparing catalysts of this invention, it will be helpful to define several terms.

"Alumina gel" as used in the description of the present invention is a hydrated alumina capable of forming a gel-like paste when treated with a strong acid. All of the alumina gels which can be employed in this process will form a paste-like gel under the following test conditions. In the test, about 50 grams of the test alumina is mixed with about 100 ml. of water at 100–150° F. Thereafter, about 10 to 15 ml. of concentrated nitric acid is added.

After stirring the resultant acidified mixture for about 5 minutes, a paste-like gel is formed.

A suitable "alumina gel" can be prepared by treating an acidified aqueous solution of an aluminum salt, e.g., aluminum nitrate, aluminum sulfate, and the like, with sufficient base to cause precipitation. Transitional aluminas such as chi, kappa, gamma, beta, eta, and alpha aluminas, which are prepared by calcining alumina hydrates, are not suitable alumina gels. "Alumina gels" which are applicable in this process can be a mixture of several forms of alumina. For example, a suitable alumina gel can contain the various aluminas obtained by the precipitation procedure mentioned above. Moreover, alumina gels which contain a minor amount of the transitional aluminas mentioned above are also applicable in this process as long as they form a paste-like gel in the forementioned test. For a discussion of alumina gels see A. S. Russell et al., "Alumina Properties," pp. 54–57, published by Aluminum Company of America (1956).

Another alumina used in the preparation of the catalyst of this invention is crystalline alumina hydrate. Crystalline alumina hydrate is a hydrated alumina which will not form a gel under the conditions of the foregoing test. Upon calcination, at 140° to about 900° C., crystalline alumina hydrates form the so-called "activated" aluminas discussed in the cited A. S. Russell et al. reference, especially on p. 34. Alternatively the more expensive "activated" aluminas may be employed, such as the alpha-monohydrate, chi, kappa, gamma, theta and eta forms of alumina. These are not preferred because of their higher cost. Any crystalline alumina hydrate manufactured by the Bayer Process is suitable.

By "clay" we mean any one of several natural products consisting essentially of alumina silicates. The preferred clays are kaolinitic clays. As used in this application, kaolinitic clay is defined as a material resulting from the natural weathering of a feldspar and includes both primary kaolins such as china clay or secondary kaolins such as ball clay. Such clays are unique materials found in large quantities in nature and are readily distinguishable from and have definite advantage over other materials proposed for this purpose. Kaolinitic clays are of a natural plastic nature having remarkedly high uniformity in their properties and are composed of silicon, oxygen and hydrogen according to the general formula $$Al_2O_3 2SiO_2 2H_2O$$

They are sometimes referred to as comprising aluminum silicates but are probably composed of aluminosilicic acid.

The process for preparing the catalysts of this invention is carried out by mixing together an alumina gel as defined above, crystalline alumina hydrate and clay. Mixing may be effected with any of several commercial mixing devices; for example, a Simpson Mix Muller (National Engineering Co., Chicago, Ill.). Although mixing can be delayed until the subsequent addition of water and acid, we prefer to mix the ingredients in a dry state because the mixing is more efficient.

The quantities of the components of this mixture may be varied within certain limits. These limits are defined herein in terms of weight percent on a calcined basis. That is, on receiving the clay, alumina gel and crystalline alumina hydrate for use in the present process, samples of each are calcined at about 850° F. and their weight loss determined. This weight loss factor for each component is used in calculating the amount of the as received raw material to be added to the mixture, so that the final composition after calcination will contain the proper amount of each ingredient. For example, if it is found that the alumina gel loses 20 percent of its weight on calcination, the amount of alumina gel used in the mixture would be increased 25 percent to compensate for this weight loss. In practice, all of the constituents undergo a weight loss on calcination, so that the weight loss factor must be applied to each component. From the foregoing, it is clear that when we state that a support consists, on a calcined basis, of a calcined mixture of 20 percent kaolin, 50 percent alumina gel and 30 percent crystalline alumina hydrate, we mean that these are the percentages of the various constituents of the final calcined support that were derived from the named starting material.

Mixing of the dry ingredients is continued until the materials are thoroughly dispersed. At this point, enough water is added to wet the entire dry mixture. The temperature of the water is not critical, but warm water is preferred, especially when the dry mix is cold. If the temperature of the water is too low, the resultant mixture will be too thick to mix properly and an excessive quantity of water will be required. A preferred water temperature is from 130 to 150° F., and a most preferred water temperature is about 140° F. The quantity of water added is not critical as long as it is sufficient to saturate the dry mixture. A preferred range of water to be added to the dry mix is from 50 to 80 parts of water by weight per 100 parts by weight of dry mix. A more preferred range is from 55 to 75 parts by weight of water per 100 parts by weight of dry mix. A most preferred range is from 60 to 70 parts of water per 100 parts of dry mix.

Following the addition of the water, mixing is continued until the mass is uniform. At this point, a strong acid is added to the mixture, causing it to gel. The exact amount of acid required varies with the acid and alumina gel used. Any strong acid may be used to gel the alumina. We prefer to use a strong mineral acid, such as nitric, hydrochloric, sulphuric, orthophosphoric and metaphosphoric acid. An especially preferred acid is nitric acid because it leaves no residue in the catalyst when it is later decomposed during calcination. When commercial nitric acid (63 percent $HNO_3$) is used, a preferred quantity is from 3 to 20 parts of nitric acid per 100 parts of dry mix. A more preferred range is from 5 to 15 parts of nitric acid per 100 parts of dry mix. A most preferred range is from 8 to 11 parts of commercial nitric acid per 100 parts of dry mix.

The strong mineral acid and the water can be combined and added to the dry mix in one step. However, we prefer to add the water and acid as separate steps so we can mix the ingredients after the water addition, and thereby obtain a very uniform catalyst. If the acid is added together with the water, gel formation starts almost immediately and this may result in inefficient mixing.

The catalyst of this invention may be in the form of granules, tablets or extrudates. Extrudates are preferred because of their low manufacturing cost and the excellent results obtained therefrom. Extrudates made following the process of the present invention have been found to exhibit exceptional hardness. It has also been found that when extrudates of the preferred size range are used in a catalytic device exceptionally low back pressures are observed. It has also been observed that extrudates exhibit higher catalytic activity than catalysts of the same composition, but in the form of granules or tablets.

In a preferred embodiment of this invention the plastic mass is extruded using any one of several types of extrusion apparatus available in commerce. If the extrudate is sticky it may be dusted with an organic dusting material which will later be decomposed and driven off during calcination.

The efficiency of the final catalyst depends, to some extent, on the size of the extrudate. In general, smaller diameter extrudates are more efficient than large diameter extrudates. However, an extrudate of too small a diameter has very little mechanical strength and will tend to be lost from the catalytic device by attrition. Another factor to be considered is that the catalyst will shrink somewhat during later calcining steps and, therefore, should be extruded to a size slightly larger than the desired final size. We prefer a final catalyst having a diameter of from 0.03 to 0.15 inch. A more preferred catalyst diameter is from 0.05 to 0.10 inch, and a most preferred diameter range is from 0.06 to 0.08 inch. In all cases, a catalyst extrudate length of from 1.5 to 10 times its diameter is preferred; however, shorter or longer extrudates can be used, if desired.

Following the extrusion step, and prior to calcination, the extrudate is dried in an oven at a comparatively low temperature. Although not critical, this is done to prevent cracking of the catalyst, which will result if it is heated too rapidly. A preferred oven temperature which results in a very satisfactory drying rate is about 225° F. The drying should be continued until the water content of the extrudate is reduced to about 5 to 20 weight percent. This may take anywhere from 8 to 24 hours, depending upon the air circulation and relative humidity in the drying oven.

The extrudate is calcined to obtain the finished support. We prefer to carry out the calcination in a manner that does not cause cracking. Slowly raising the temperature will prevent cracking. Although not critical, we prefer to heat the extrudate slowly from about 300 to about 1000° F. In a more preferred embodiment of this step in the process the extrudate is heated from about 300 to about 1000° F. during a period of about 8 hours. In a most preferred embodiment of the calcination the extrudate is placed in a calcination oven at 300° F. and the temperature raised according to the following program: one hour at 300° F., one hour at 400° F., one hour at 600° F. and four hours at 850° F.

In one method of carrying out the process of this invention the extrudate is impregnated with copper following the calcination step. In another method of carrying out the process the copper compound is added to the original dry mix ingredients and carried through all subsequent steps. When an insoluble copper compound is used as a source of copper we prefer to add it to the dry mix. In another method of carrying out our process the copper compound can be added to the catalyst wet mix either as a solid copper compound or dissolved in water or acid. The point during the process at which the copper compound is added is not critical. All that is desired is that the copper compound should be well dispersed in the catalyst and should be capable of decomposing to form copper oxide on heating in the presence of oxygen. The copper compound used in our process may be a soluble or insoluble compound. Examples of copper compounds suitable for use in our process are cupric acetate, cupric formate, cupric oxide, cupric ammonium carbonate, basic cupric carbonate (azurite or malachite), cupric hydroxide, cupric nitrate, cupric oxylate, cupric sulphate, cupric sulfide, and the like. Likewise, the corresponding cuprous copper compounds, such as cuprous carbonate, cuprous cyanide, cuprous hydroxide, cuprous oxide, cuprous sulfide, and the like, may be employed.

In a preferred embodiment of the process the calcined extrudate is impregnated with an aqueous solution of a soluble copper compound. In a most preferred embodiment of the process the calcined extrudate is impregnated with an aqueous solution of cupric ammonium carbonate. The concentration of the copper solution is not critical and can be varied, depending upon the amount of copper desired in the final catalyst. For example, a solution containing 3.08 weight percent copper as cupric ammonium carbonate will impregnate the calcined support of this invention to give a final catalyst containing about 1.6 weight percent copper. In a similar manner, a solution containing 11.1 weight percent copper in the form of cupric ammonium carbonate will give a final catalyst containing about 5 weight percent copper. Higher copper contents may be attained through the use of other solutions or by employing several impregnation dips followed by a calcination step between each.

Palladium may be introduced into the catalyst as a separate step or together with the copper impregnation step. As with copper, the palladium may be added at any stage prior to the extrusion or it may be added following calcination. The palladium may be in a soluble or insoluble form. If it is in an insoluble form it is preferably added during a mixing step prior to extrusion. A soluble form of palladium, such as palladium chloride or palladium sulphate, is preferred. In one embodiment of our process the palladium compound is impregnated into the catalyst together with the copper and after calcination. In a more preferred embodiment of the process the copper impregnated catalyst is calcined as previously described and then impregnated with palladium using an aqueous solution of palladium chloride. When the palladium is impregnated into the catalyst in this manner it tends to concentrate in the outer part of the catalyst where it is more effective. Another equally satisfactory method of impregnating the catalyst with palladium is to spray the calcined copper impregnated catalyst with an aqueous solution of a palladium compound.

Following the final impregnation the catalyst is dried. A preferred drying temperature range is from 200 to 400° F. A most preferred drying temperature is about 225° F. Drying should be continued until the catalyst is substantially free of water. By substantially free of water we mean that the catalyst should contain less than 10 weight percent water and preferably less than 5 weight percent water. After drying, the catalyst is ready for use.

The forms in which the copper and palladium occur in the catalyst are dependent upon temperature and the oxidative or reductive nature of the surrounding atmosphere. At elevated temperature, and in an oxidative atmosphere, the copper remains in an oxide form, but at elevated temperature the palladium is probably in the form of a free metal. It should be understood that the exact state of the copper or palladium is a dynamic equilibrium, depending upon the environment.

The catalysts of the present invention have a high specific surface area. When a copper palladium catalyst is supported on a low surface carrier, such as $\alpha$-alumina, very little activity is observed. We prefer a catalyst having a surface area of over 75 m.$^2$/g.

The following examples illustrate the novel catalysts of this invention and methods of preparing them. All parts are by weight unless otherwise indicated.

EXAMPLE I

To a Simpson Mix Muller was added 127 parts of crystalline alumina hydrate, 197 parts of alumina gel and 64 parts of kaolin. On a calcined basis, this mixture was equivalent to 30 percent crystalline alumina hydrate, 50 percent alumina gel and 20 percent kaolin. The mixture was dry mixed for 15 minutes and then 250 parts of water were added. The resultant mixture was then wet mixed for an additional 15 minutes after which 33 parts of commercial nitric acid (63 percent) was added. The mixture was mixed for an additional 15 minutes at which time it had gelled to a pasty opaque semi-solid. The pasty mass was extruded using a die having 0.08 inch holes. The extrudate so formed was dried in an air-circulating oven at 225° F. After 16 hours, the water content of the extrudate was below 20 percent and the extrudate was removed from the drying oven and placed in a calcining oven at 300° F. The extrudate was then calcined using the following temperature program: one hour at 300° F., one hour at 400° F., one hour at 600° F. and four hours at 850° F.

The calcined extrudate was allowed to cool and was then impregnated with copper by the following procedure. An impregnating mixture was prepared containing 110 parts of water, 99 parts of commercial aqueous ammonia, 10.4 parts of $CO_2$ (Dry Ice) and 12.9 parts of basic copper carbonate (55 weight percent copper). The calcined extrudate was poured into the above copper solution and allowed to stand therein for 15 minutes. During this period the extrudate imbibed 115 parts of the solution. Excess solution was then drained from the impregnated extrudate and the extrudate was again calcined using the same temperature program described above. Following the second calcination, the copper impregnated extrudate was impregnated with palladium by pouring it into a solution of 1.59 parts of palladium chloride dissolved in water sufficient to cover the extrudate. After standing in the palladium chloride solution for about 30 minutes the extrudate had adsorbed all of the palladium from the solution. The copper-palladium impregnated extrudate was then drained of excess water and dried for 8 hours in an air circulating oven maintained at 225° F. The final catalyst contained 1.6 weight percent copper in an oxide form and 0.3 weight percent palladium.

EXAMPLE II

In a manner similar to Example I, 165 parts of crystalline alumina hydrate, 430 parts of alumina gel and 25 parts of clay are dry mixed in a Mix Muller. On a calcined basis, this is the equivalent of 5 percent clay, 70 percent alumina gel and 25 percent crystalline alumina hydrate. To the thoroughly mixed ingredients is added a solution of 54 parts of commercial nitric acid in 365 parts of water. Agitation is continued until a pasty mass has formed. The pasty mass is extruded, dried and calcined in the same manner as in Example I. The calcined extrudate is allowed to stand in a 10 percent cupric sulphate solution sufficient to cover the extrudate. After 15 minutes the excess solution is drained and the impregnated extrudate is calcined in the manner previously described. Following this second impregnation, the excess liquid is drained and the impregnated extrudate is again calcined in the manner previously described. After this third calcination the impregnated extrudate is allowed to stand in an aqueous solution containing 0.095 part of palladium sulphate sufficient to cover the extrudate. After about 30 minutes all of the palladium has been adsorbed into the extrudate and the excess water is drained. The copper-palladium impregnated extrudate is then dried for eight hours in an air circulating oven maintained at 300° F. The resultant catalyst contains 0.01 weight percent palladium and 5 weight percent copper supported on a carrier consisting essentially of a calcined mixture of 25 weight percent crystalline alumina hydrate, 70 weight percent alumina gel and 5 weight percent clay, all on a calcined basis.

Equally good results are obtained when other soluble copper compounds such as cupric acetate and cupric formate are used in preparing the copper containing solution of Example II.

EXAMPLE III

The following ingredients are dry mixed in a Mix Muller: 53 parts crystalline alumina hydrate, 36 parts alumina gel, 30 parts ball clay and 18.8 parts cupric oxide. Excluding the cupric oxide, this is equivalent, on a calcined basis, to 40 weight percent crystalline alumina hydrate, 30 weight percent alumina gel and 30 weight percent clay. After the ingredients are thoroughly mixed a solution of 60 parts of commercial nitric acid in 51 parts of water is added to the dry mixture and agitation is continued for 15 minutes, at which time a pasty mass has formed. The pasty mass is extruded, dried, and calcined as previously described. Following the calcination the copper impregnated extrudate is placed in a tumbling basket and a dilute aqueous solution containing 0.33 part of palladium chloride is sprayed over the tumbling catalyst. Following the palladium chloride spray the catalyst is dried for eight hours at 250° C., resulting in a finished catalyst containing 15 weight percent copper and 0.2 weight percent palladium supported on a carrier consisting essentially of a calcined mixture of 40 weight percent crystalline alumina hydrate, 30 weight percent alumina gel and 30 weight percent kaolin, all on a calcined basis.

Equally good results are obtained when other insoluble copper compounds, such as cupric carbonate, cupric hydroxide, cupric oxylate, cupric sulfide and other similar cuprous compounds are used in the above example.

EXAMPLE IV

As in Example I, 132 parts of crystalline alumina hydrate, 204 parts alumina gel and 66 parts of kaolin are dry mixed in a Mix Muller. On a calcined basis, this is equivalent to 30 weight percent crystalline alumina hydrate, 50 weight percent alumina gel and 20 weight percent kaolin. After the ingredients are thoroughly mixed a solution of 260 parts water, 35 parts nitric acid, 48.7 parts cupric nitrate and 0.55 part of palladium chloride is added to the dry mixture. Mixing is continued for about 15 minutes, at which time the pasty mass is extruded through a 0.08 inch die. The extrudate is dried at 225° F. for 16 hours, at which time it contains less than 20 percent water and then calcined employing the same temperature program used in Example I. The resultant catalyst contains 5 weight percent copper, 0.1 weight percent palladium supported on a carrier consisting essentially of a calcined mixture of 30 weight percent crystalline alumina hydrate, 50 weight percent alumina gel and 20 weight percent kaolin, all on a calcined basis.

Equally good results are obtained in the foregoing examples when a chemically equivalent amount of hydrochloric, sulphuric or orthophosphoric acid is used in place of nitric acid.

EXAMPLE V

In a manner similar to Example I, 100 parts of kaolin, 618 parts of alumina gel, 532 parts of crystalline alumina hydrate, 87 parts of cupric oxide and 2.2 parts of palladium nitrate are thoroughly mixed in a Simpson Mix Muller. A solution of 123 parts of commercial nitric acid (63 weight percent $HNO_3$) in 870 parts of water is added to the dry mixture and mixing is continued until a plastic mass is formed. The plastic mass is then extruded through a 0.08 inch die and the extrudate is dried at 250° F. for eight hours, at which time it contains less than 20 percent water. The dried extrudate is then calcined, using the same temperature program employed in Example I. The resultant catalyst contains 7 weight percent copper and 0.1 weight percent palladium, supported on a carrier consisting essentially of a calcined mixture of 10 weight percent kaolin, 50 weight percent alumina gel and 40 weight percent crystalline alumina hydrate, all on a calcined basis.

During the following discussion of catalyst composition, frequent reference will be made to catalytic activity as determined by several test methods. Important test criteria are percent conversion of hydrocarbon and carbon monoxide under wide open throttle (WOT) operation, idle activity, and hardness. Percent conversion (oxidation) of hydrocarbons and carbon monoxide are important because these are exhaust constituents which constitute the noxious components of exhaust gas. Wide open throttle and idle conditions represent the two extremes of operating conditions under which the catalyst must be effective. Hardness is important because it is a measure of the catalyst ability to resist loss through attrition. Percent conversion of hydrocarbon and carbon monoxide are determined using a non-dispersive infrared spectrometer, Liston Becker Model 15A. The same instrument will measure both hydrocarbon and carbon monoxide by merely changing detector cells.

Idle activity is the ability of a catalyst to become active at low temperatures when the exhaust gas from an engine at idle is passed through it. Idle activity is measured by several criteria. The first of these is the "activation temperature." The activation temperature is determined by passing the exhaust gas from an idling test engine through a cool catalyst bed. The temperature of the inlet exhaust gas and of the catalyst bed are constantly monitored and the activation temperature is the temperature of the inlet exhaust gas at the time when the catalyst bed temperature exceeds the inlet exhaust temperature by 50° F. The idle activity of a catalyst after use for a specified period of time is determined as follows. The engine is stopped and the catalyst bed is allowed to cool to 200° F. The test engine is then restarted with an idle speed of about 600 r.p.m. and an air/fuel ratio of 11.5. An additional 100 cubic feet per hour (c.f.h.) of auxiliary air is bled into the exhaust stream and the mixture then passed through the cool catalyst bed. As before, the temperature of the inlet gas and the catalyst bed are monitored and the inlet exhaust temperature, at the time when the catalyst bed temperature exceeds the inlet exhaust temperature by 50° F. is recorded as the activation temperature.

Another test value used as a measure of catalyst activity is the maximum catalyst bed temperature (called "maximum temperature") reached during idle while the exhaust inlet temperature equilibrates at from about 530 to 550° F. A catalyst having good idle activity will have a low "activation temperature," preferably under 500° F., and a high "maximum temperature" on the order of 1200 to 1400° F.

In determining the effect of extended use a test is conducted in which the exhaust gas from a CFR-L head engine (7:1 compression ratio) is passed through the catalyst bed for a specified period of time. During this test the engine is operated under what are called "Standard Test Conditions." These conditions are summarized in the following table:

TABLE I.—STANDARD TEST CONDITIONS

| | Idle | WOT |
|---|---|---|
| Time in seconds | 50 | 150. |
| Speed in r.p.m. | 750 | 1,115. |
| Load | None | WOT. |
| A/F | 11.5 | 13.5. |
| Ignition timing | 10° ATC | 10° ATC. |
| Oil sump, ° F | 160 | 160. |
| Carburetor air, ° F | 110 | 110. |
| Make-up air, c.f.h | 100 | 100. |

NOTE.—Maximum bed temperature 1,600° F. or less. Fuel—Indolene plus 12 ml. TEL/gas as 62 mix plus 0.12 weight percent S.

Most of the items in the above table are self-explanatory. For example, the test engine is idled for 50 seconds and then run at WOT for 150 seconds, and then back to idle, and so forth, for the duration of the test. The air/fuel weight ratio is designated by A/F. One item needing clarification is the heading "make-up air." This is auxiliary air bled into the exhaust system between the engine and the exhaust catalyst. As stated in the above table, under Standard Test Conditions, 100 c.f.h. of air bled into the exhaust gas prior to reaching the exhaust catalyst under both idle and WOT operation. In some tests the Standard Test Conditions are modified in respect to make-up air and reduced make-up air is used. In the discussion that follows, any deviation from the Standard Test Conditions will be pointed out.

One modification of the Standard Test Condition, called the Oxodation-Reduction Test Condition, is worthy of separate comment. Under these test conditions, the make-up air is cut off completely during idle operation and used only during WOT operation. This results in an oxidative atmosphere during WOT operation and a reducing atmosphere during idle operation. This environment is extremely severe with respect to catalyst hardness and has been found to be a valuable test procedure in screening catalysts with respect to their ability to withstand loss caused by attrition.

In the above Standard Test Conditions and Oxidation-Reduction Test Conditions, the maximum catalyst bed temperature is fixed at 1600° F. At this temperature a by-pass valve opens.

The fuel used under Standard Test Condition contains 12 ml. of tetraethyl lead (TEL) per gallon. This is four to five times the normal TEL content of gasoline. This high concentration of TEL is used to severely test catalyst "aging" with respect to possible lead poisoning. The tetraethyl lead is added to the fuel as 62 Mix. This means that there is copresent in the fuel 1.0 theory of 1,2-dichloroethane and 0.5 theories of 1,2-dibromoethane. A theory is the equivalent amount of either halogen compound theoretically required to convert the lead present to the volatile lead halide. The fuel used in the standard test procedure also contains 0.12 weight percent sulphur. This is an extremely high sulphur content and is used because sulphur is also known to be a catalyst poison. In summary, the fuel used in the standard test procedure is much more severe on the test catalyst than any fuel that will be encountered in actual use by the motoring public.

In testing a catalyst the exhaust gas for the engine running on the standard test program is divided equally and passed through two catalytic mufflers, each containing 42 cubic inches of catalyst. This procedure is carried out for specified periods of time and then the efficiency of the exhaust catalyst is determined using the forementioned test procedures.

Another extremely important property of the catalyst is its ability to withstand loss caused by attrition. Many catalysts have been found to have excellent catalytic activity, but on use they tend to powder and are thereby lost from the catalytic device. No matter how effective a given catalyst is for oxidizing the components of exhaust gas it has no value if it will not remain in the catalytic device. We call this property of retaining physical integrity "hardness." Catalyst hardness is determined after the catalyst has been subject to actual use for a specified period of time. About 200 ml. of the catalyst is screened, using a U.S. Standard Sieve Series 16 Screen, to remove fines. It is then weighed and placed in a quart can and then shaken in a paint shaker for one hour. Following this, the catalyst is again screened, using a U.S. Standard Sieve Series 30 screen, to remove fines. The percent weight loss of the catalyst is recorded as its "Hardness Number." The higher the Hardness Number the softer the catalyst. A catalyst satisfactory for use as an exhaust catalyst in an internal combustion engine exhaust system should preferably have a Hardness Number less than about 3 when determined by the above method.

The support used in our catalyst is derived essentially from three components; clay, alumina gel and crystalline alumina hydrate. For the sake of convenience, in Tables 2 to 10 the composition of the support is designated by three numbers, each signifying the percent on a calcined basis of one of the ingredients present in the support. For example, if a support was derived from a mixture containing, on a calcined basis, 10 weight percent clay, 50 weight percent alumina gel and 40 weight percent crystalline alumina hydrate, it is referred to as a 10-50-40 support. This terminology will be used in the following discussion.

One of the constituents of the support material of our catalyst is clay. The preferred supports of our catalyst contain, on a calcined basis, from about 5 to about 30 weight percent clay. An especially preferred clay content of our supports is from about 8 to about 25 weight percent. The function of the clay in the support appears to be two fold. Its primary function is to increase the hardness of the finished catalyst. A second function of the clay is to promote catalytic activity. The following table illustrates the effect of various clay contents on both the hardness and catalytic activity of exhaust catalysts. The clay used in these tests was a kaolinitic clay.

TABLE 2.—EFFECT OF CLAY CONTENT ON CATALYST ACTIVITY CFR-L HEAD ENGINE UNDER STANDARD TEST CONDITIONS

| Catalyst [1] | Support composition | Percent conversion at end of 60 hrs. | | Idle activity | | Hardness No. |
|---|---|---|---|---|---|---|
| | | Hydrocarbon | Carbon monoxide | Activation temp. (° F.) | Max. temp. (° F.) | |
| A | 5-50-45 | 56 | 77 | 560 | | 14.5 |
| B | 10-50-40 | 52 | 63 | 465 | 1,200 (540) | 1.6 |
| C | 20-50-30 | 69 | 81 | 460 | 1,360 (540) | 0.9 |
| D | 30-30-40 | 41 | 56 | 560 | | 0.6 |
| E | 50-10-40 | 33 | 42 | [2] NA | | 0.7 |

[1] Catalysts A and B contain 7 weight percent Cu and 0.1 weight percent Pd. The remaining three contain 6.4 weight percent Cu and 0.075 weight percent Pd.
[2] NA means not active.

These results demonstrate the criticality of the clay content of our catalyst. High clay content leads to low activity catalysts, and low clay content leads to both low activity and especially to poor hardness.

A second constituent of the support is alumina gel. Alumina gel as used in this discussion has been previously defined. The primary function of alumina gel is to provide a catalyst having a low hardness number. The alumina gel content must also be maintained within certain limits or catalyst activity will fall off. These limits depend to some extent upon the clay content of the catalyst. A catalyst containing 10 percent clay can tolerate a much wider range of alumina gel content than a catalyst containing 30 percent clay. For example, compare catalyst F with H in the following Table 3. Both of these catalysts contain 30 percent alumina gel. This quantity of gel is well tolerated in the catalyst in H containing 10 percent clay, but in F, containing 30 percent clay, the same amount of alumina gel has resulted in a distinct decrease in hydrocarbon and carbon monoxide conversion and a corresponding increase in activation temperature. This table clearly demonstrates that the preferred catalyst of this invention should contain, on a calcined basis, from 30 to 70 weight percent alumina gel. Alumina gel contents, both below and above this range, result in catalysts having inferior hydrocarbon and carbon monoxide conversion and increased activation temperatures.

TABLE 3.—EFFECT OF ALUMINA GEL CONCENTRATION ON CATALYST ACTIVITY—CFR-L HEAD ENGINE UNDER STANDARD TEST CONDITIONS (ALL CATALYSTS CONTAIN 6.4 WEIGHT PERCENT COPPER AND 0.075 WEIGHT PERCENT Pd)

| Catalyst | Support composition | Percent conversion at WOT at end of 60 hrs. | | Idle activity at end of 60 hrs. | | Hardness No. |
|---|---|---|---|---|---|---|
| | | Hydrocarbon | Carbon monoxide | Activation temp. | Max. temp. reached [2] | |
| F | 30-30-40 | 41 | 56 | 560 | | 0.6 |
| G | 20-20-60 | 63 | 84 | [1] NA | | 2.2 |
| H | 10-30-60 | 75 | 93 | 460 | 1,400, (490) | 3.9 |
| I | 10-50-40 | 63 | 74 | 485 | 1,240 (540) | 1.5 |
| J | 10-70-20 | 57 | 70 | 500 | 1,380 (540) | 1.0 |
| K | 10-90-0 | 51 | 71 | NA | | 1.0 |

[1] NA means not active.
[2] Number in parenthesis is inlet exhaust temperature.

Crystalline alumina hydrate serves to give body to the extrudate and increase the surface area of the final catalyst. Catalyst K in Table 3, containing 6.4 weight percent copper and 0.075 weight percent palladium, supported on a carrier consisting of only clay and alumina gel (10-90-0), showed no idle activity at the end of 60 hours operation under Standard Test Conditions.

Catalysts of the present invention contain palladium. A preferred palladium concentration is from .01 to 0.3 weight percent. An especially preferred concentration range is from .01 to 0.2 weight percent palladium. The function of the palladium is especially apparent in the catalyst of this invention when the catalyst bed is cold. A copper catalyst without palladium displays very little activity at catalyst bed temperatures below 500° F. The preferred catalyst of the present invention exhibits idle activity at catalyst bed temperatures as low as 400° F. That is, at temperatures as low as 400° F., the catalyst of the present invention will catalyze the oxidation of the hydrocarbons and carbon monoxide of exhaust gas to an extent sufficient to raise the catalyst bed temperature 50° F. warmer than the temperature of the incoming exhaust gas. Since there is a significant time lag between the time an engine is started and the time that the catalyst bed temperature reaches the threshold temperature of the catalyst, unburned hydrocarbons and carbon monoxide will be released into the atmosphere during the warm-up period. Thus, even though a catalyst might perform satisfactorily when it has finally reached its operating temperature, it may be unsatisfactory on an average emission basis when idle and warm-up emissions are included. With the catalyst of the present invention this warm-up time is significantly reduced because of the low activation temperature. This in effect reduces the average hydrocarbon and carbon monoxide emission.

There is very little effect on WOT efficiency when palladium concentrations are raised above 0.02 weight percent. As shown in the following Table 4, idle activity is improved by increasing the palladium concentration to 0.04 weight percent.

TABLE 4.—EFFECT OF PALLADIUM CONCENTRATION ON CATALYST ACTIVITY SINGLE CYLINDER AT STANDARD-TEST CONDITIONS

| Cat. No. | Cu, weight percent | Pd, weight percent | Support all 1/16 inch ext. | Percent conv. at WOT at 60 hrs. | | Idle activity at 60 hrs. | | Hardness |
|---|---|---|---|---|---|---|---|---|
| | | | | HC | CO | Act. temp., °F. | Max. temp., °F. | |
| L | 7 | | 20-50-30 | 56 | 68 | ([1]) | | 1.2 |
| M | 7 | 0.02 | 20-50-30 | 69 | 82 | ([2]) | | 0.9 |
| N | 7 | 0.04 | 20-50-30 | 66 | 81 | 485 | 1,240 (520) | 1.3 |
| O | 7 | 0.05 | 20-50-30 | 73 | 86 | 480 | 1,260 (540) | 1.1 |
| P | 7 | 0.08 | 20-50-30 | 62 | 75 | 465 | 1,460 (520) | 0.8 |
| Q | 7 | 0.10 | 20-50-30 | 64 | 80 | 465 | 1,300 (540) | 0.6 |

[1] NA at 20 hrs.
[2] NA at 40 hrs.

The above table clearly indicates the beneficial effect of small amounts of palladium in the catalyst of the present invention. The effect is most prevalent under idle conditions, where, as indicated above, a catalyst containing 7 weight percent copper and less than 0.04 weight percent palladium displayed no idle activity after 40 hours of operation. When the same catalyst contains .04 weight percent palladium it is active at an inlet exhaust temperature of 485° F. and reaches a bed temperature of 1240° F. when the inlet exhaust temperature is 520° F.

Table 5 demonstrates the effect of even higher amounts of palladium when the idle activity is carried out under Oxidation-Reduction Test Conditions. It can be seen that idle activity continues to improve at palladium concentrations of 0.2 weight percent. In practice, there is an economic limit in the amount of palladium that can be incorporated into an exhaust catalyst. For this reason, we prefer to limit our palladium concentration below 0.3 weight percent because any improvement observed at higher concentrations is not commensurate with the additional cost.

TABLE 5.—EFFECT OF PALLADIUM CONCENTRATION ON CATALYST ACTIVITY OXIDATION-REDUCTION TEST CONDITIONS

| Cat. No. | Cu, weight percent | Pd, weight percent | Support all 1/16 inch ext. | Percent conv. at WOT at 60 hrs. | | Idle activity at 60 hrs. | | Hardness |
|---|---|---|---|---|---|---|---|---|
| | | | | HC | CO | Act. temp., °F. | Max. temp., °F. | |
| R | 6 | 0.05 | 10-50-40 | 43 | 78 | (¹) | | 0.9 |
| S | 6 | 0.10 | 10-50-40 | 49 | 83 | 500 | 970 (530) | 2.2 |
| T | 6 | 0.20 | 10-50-40 | 52 | 86 | 490 | 1,365 (540) | 1.7 |

¹ NA at 20 hrs.

We have found that higher copper concentrations tend to mask the low temperature activity induced by palladium. In other words, if two catalysts have the same palladium content, the one having the lower copper concentration will exhibit better low temperature efficiency, whereas the catalyst having the greater copper concentration will be more efficient under WOT conditions. This property of our catalyst is shown in the following Table 6. In this test, two catalysts, Catalyst U and Catalyst V, both on a 10-50-40 support and containing 0.1 weight percent palladium, were subject to operation under Oxidation-Reduction Test Conditions. Catalyst U contained 0.8 weight percent copper and Catalyst V contained 10 weight percent copper. WOT conversion and idle activity were determined at the start of the test and every 20 hours thereafter through 80 hours. The results clearly demonstrate the superiority of Catalyst V, the high copper catalyst, under WOT operation and, on the other hand, the superiority of Catalyst U, the low copper catalyst, under warm-up and idle conditions.

We sometimes prefer to stratify the catalyst bed rather than mix the different catalysts uniformly throughout the bed. Thus, in another preferred embodiment of the present invention the forward 10 weight percent of the catalyst bed is composed of a catalyst consisting of 0.2 weight percent palladium, 0.8 weight percent copper in an oxide form, and a 20-50-30 support, and the remaining 90 weight percent of the catalyst bed is composed of a catalyst consisting of 0.01 weight percent palladium, 7 weight percent copper in an oxide form, and a 20-50-30 support. In a stratified catalyst bed as just described, the temperature of the incoming exhaust gas is raised in the forward section of the catalyst bed to a temperature at which the low palladium content catalyst in the after section of the catalyst bed is active.

The catalysts of our invention contain from 0.25 to 15 weight percent copper. The highly preferred catalysts of this invention contain from 0.5 to 7 weight percent copper. Conversion of hydrocarbons under the Standard Test Conditions listed above increases with increasing TABLE 6.—EFFECT OF COPPER CONCENTRATION ON WOT AND IDLE ACTIVITY OF A CONSTANT PALLADIUM CONTENT CATALYST

| | Percent conversion at WOT | | | | Idle activity | | | |
|---|---|---|---|---|---|---|---|---|
| | Hydrocarbon | | Carbon monoxide | | Act. temp., °F. | | Max. temp. | |
| Catalyst | U | V | U | V | U | V | U | V |
| Start of test | 65 | 67 | 82 | 92 | <300 | 440 | 1,470 (530) | 1,140 (500) |
| After— | | | | | | | | |
| 20 hours | 57 | 82 | 75 | 95 | 385 | 455 | 1,520 (535) | 1,075 (490) |
| 40 hours | 54 | 74 | 78 | 92 | <450 | 450 | 1,530 (530) | 605 (520) |
| 60 hours | 45 | 65 | 74 | 92 | 420 | 475 | 1,465 (530) | 545 (520) |
| 80 hours | 50 | 55 | 77 | 87 | 400 | NA | 1,600 (540) | |

In either case, palladium is not as effective in the absence of copper at low temperature nor is copper as effective in the absence of palladium at high temperature. In order to take advantage of the low temperature activity of a high palladium-low copper concentration catalyst and of the WOT efficiency of a high copper-low palladium catalyst, we sometimes prefer to use a mixture of different copper-palladium content catalysts. For example, in one embodiment of the present invention, the final catalyst is a mixture composed of about 90 weight percent of a catalyst consisting of 0.01 weight percent palladium and 15 weight percent copper impregnated on a 20-50-30 support. The remaining 10 weight percent is a catalyst consisting of 0.1 weight percent palladium and 1.0 weight percent copper impregnated on a 20-50-30 support.

Another preferred embodiment of the present invention is a catalyst composed of 98 weight percent of a catalyst consisting of 0.01 weight percent palladium and 7 weight percent copper impregnated on a 10-50-40 support, and the remaining 2 weight percent composed of a catalyst consisting of 0.3 weight percent palladium and 0.5 weight percent copper and a 10-50-40 support.

copper content in a catalyst of our invention containing a fixed amount of palladium. This property is demonstrated in the following Table 7 which reports data collected on several different copper-palladium catalysts supported on a 10-50-40 support. In these different catalysts the palladium content was held constant at 0.1 weight percent and the copper content varied from 3.2 weight percent to 14 weight percent. Exhaust gas was passed through a catalyst bed of the various catalysts under the previously described Standard Test Conditions. Percent conversion at WOT of hydrocarbon and carbon monoxide was determined at the end of 60 hours. Idle activity was also determined at the end of 60 hours. These results show that under Standard Test Conditions hydrocarbon conversion increases as copper content increases and that carbon monoxide conversion is not significantly affected by increasing copper content above 3.2 weight percent. It can also be seen that idle activity is not significantly affected by increased copper concentration. At high copper content the hardness number of the catalyst is increasing sharply. In summary, increasing copper content increases hydrocarbon conversion at WOT but tends to produce a softer catalyst.

TABLE 7.—EFFECT OF COPPER CONCENTRATION ON CATALYST ACTIVITY AT STANDARD-TEST CONDITIONS

| Cat. No. | Cu weight percent | Pd. weight percent | Support all 1/16" ext. | Percent conv. at WOT at 60 hrs. | | Idle activity at 60 hrs. | | Hardness |
|---|---|---|---|---|---|---|---|---|
| | | | | HC | CO | Act. Temp., °F. | Max. Temp., °F. | |
| W | 3.2 | 0.10 | 10-50-40 | 55 | 75 | 515 | 670 (540) | 1.6 |
| X | 6.4 | 0.10 | 10-50-40 | 52 | 63 | 465 | 1,200 (540) | 1.6 |
| Y | 7.3 | 0.10 | 10-50-40 | 56 | 72 | 460 | 1,250 (530) | 1.3 |
| Z | 9.8 | 0.10 | 10-50-40 | 61 | 76 | 450 | 1,340 (540) | 1.2 |
| AA | 11.1 | 0.10 | 10-50-40 | 64 | 76 | 500 | 730 (540) | 3.2 |
| AB | 14.0 | 0.10 | 10-50-40 | 69 | 90 | 510 | 1,060 (550) | 4.2 |

Further tests were carried out using the "Oxidation-Reduction Test." These tests demonstrated that, although all the copper concentrations tested above 1 percent showed over 50 percent conversion of hyldrocarbon and over 80 percent conversion of carbon monoxide at the end of 60 hours, there was a definite trend toward softer catalysts at higher copper levels. These results are given in the following Table 8.

TABLE 8.—EFFECT OF COPPER CONCENTRATION ON CATALYST ACTIVITY OXIDATION-REDUCTION TEST CONDITIONS

| Cat. No. | Cu, weight percent | Pd, weight percent | Support 1/16″ Ext. | Percent Conv. at WOT at 60 hrs. | | Idle Activity at 60 hrs. | | Hardness at E.O.T. |
|---|---|---|---|---|---|---|---|---|
| | | | | HC | CO | Act. Temp., °F. | Max. Temp., °F. | |
| AC | 0.8 | 0.10 | 10-50-40 | 45 | 67 | 520 | | 1.3 |
| AD | 1.6 | 0.10 | 10-50-40 | 51 | 80 | 480 | 1,035 (490) | 1.7 |
| AE | 3.8 | 0.10 | 10-50-40 | 60 | 90 | 475 | 815 (510) | 1.3 |
| AF | 6.2 | 0.10 | 10-50-40 | 50 | 82 | 500 | 840 (540) | 2.2 |
| AG | 7.4 | 0.10 | 10-50-40 | 61 | 90 | 480 | 709 (495) | 7.6 |

Further tests were carried out under Oxidation-Reduction Conditions. The Oxidation-Reduction Test Conditions were chosen because these conditions are most severe in determining catalyst hardness. These conditions are actually more severe than those encountered by an exhaust catalyst in actual use. Although these conditions are extremely severe we have found this tests to give an accurate indication in a short time of whether a particular catalyst is suitable for use as an exhaust catalyst. In these further tests a series of copper-palladium catalysts was prepared using two different supports; one a 10-50-40 support and the other a 20-50-30 support. All of the catalysts contained 0.1 weight percent palladium but varying amounts of copper. After the different catalysts had been subject to the Oxidation-Reduction Test Conditions for a period of 80 hours the Hardness Number of the catalyst was determined using the previously described method. These results are given in the following Table 9.

TABLE 9.—EFFECT OF COPPER CONCENTRATION ON CATALYST HARDNESS

| Cat. No. | Support | Weight Percent Pd | Weight Percent Cu | Hardness Number |
|---|---|---|---|---|
| AH | 10-50-40 | 0.1 | 1.6 | 1.5 |
| AI | 10-50-40 | 0.1 | 1.6 | 1.3 |
| AJ | 10-50-40 | 0.1 | 3.2 | 1.8 |
| AK | 10-50-40 | 0.1 | 4.4 | 1.3 |
| AL | 10-50-40 | 0.1 | 6.5 | 2.4 |
| AM | 10-50-40 | 0.1 | 9.8 | 7.4 |
| AN | 10-50-40 | 0.1 | 11.0 | 25.6 |
| AO | 20-50-30 | 0.1 | 1.6 | 0.7 |
| AP | 20-50-30 | 0.1 | 3.2 | 0.9 |
| AQ | 20-50-30 | 0.1 | 5.0 | 1.0 |
| AR | 20-50-30 | 0.1 | 6.1 | 1.6 |
| AS | 20-50-30 | 0.1 | 7.0 | 2.4 |
| AT | 20-50-30 | 0.1 | 8.7 | 8.0 |
| AU | 20-50-30 | 0.1 | 10.0 | 12.0 |

These results clearly show that in either support material the catalyst hardness is a function of copper content. A sharp break in the Hardness Number was found to occur in the region from 6 to 8 weight percent copper. Above this range the Hardness Number increases rapidly. For example, on the 10-50-40 support containing 0.1 weight percent palladium the Hardness Number increased from 2.4 to 25.6—a ten-fold increase—on increasing the copper content from 6.5 to 11 weight percent. This is dramatic evidence of the relationship of copper content to hardness in the specific supports of the present invention that has now been discovered and applied in defining the specific catalyst of the present invention. We call this point where the relationship of copper content to hardness shows a sharp break "the point of incipient crystallization." As indicated in Table 9, in a 10-50-40 catalyst this point occurs at about 6.5 weight percent copper under Oxidation-Reduction Test Conditions. Under the same conditions, but with a 20-50-30 catalyst, this point occurs at about 7 weight percent copper. It can be seen, then, that the exact point of incipient crystallization is altered by changes in the catalyst compositions of the present invention. It has also been made apparent in the previous data reported that the results obtained with a catalyst are dependent upon the environmental conditions to which the catalyst is subjected. In the above tests, results obtained under Standard Test Conditions and Oxidation-Reduction Test Conditions are reported. There is a difference in degree of severity between the two sets of conditions. For this reason, the point of incipient crystallization observed under Oxidation-Reduction Test Conditions will shift to a higher copper concentration when observed under Standard Test Conditions. It is for this reason that we prefer to restrict our copper concentration at from 0.25 to 15 weight percent. This copper concentration range will include the point of incipient crystallization encountered when the catalyst is subjected to actual use by the motoring public. The importance of catalyst hardness cannot be stressed too strongly because no matter how effective a catalyst might be it is of no avail if it powders on use and is blown out of the catalytic device or even if it powders to an extent sufficient to cause exhaust gas back pressure to build up in the exhaust system of the engine.

We have now fully described the unique catalyst of our invention and the process for preparing them. We have also described the great utility of these catalysts in reducing atmospheric contamination caused by unburned constituents in internal combustion engine exhaust. In practice, the catalysts of the present invention are incorporated into the exhaust system of an internal combustion engine. In this manner, the exhaust gases are passed through a bed of the exhaust gas catalyst. The catalysts of this invention perform equally well in reducing atmospheric contamination when used in the exhaust system of a spark-ignited internal combustion engine or when used in the exhaust system of a diesel engine. In a preferred embodiment of the method of catalytically oxidizing exhaust gas, auxiliary air is premixed with the exhaust gas prior to contacting the catalyst. In an especially preferred embodiment of the method of contacting the exhaust gas together with atmospheric oxygen with the catalyst, the catalyst is contained in a catalytic device performing the dual function of containing the catalyst bed and muffling the sound of the internal combustion engine. Such devices are commonly referred to as catalytic mufflers. They comprise a catalyst container having an exhaust inlet and outlet with means provided to pass the exhaust gas through the catalyst bed. In a preferred embodiment of a catalytic muffler means are provided to mix air with the exhaust gas before contacting the catalyst bed. We have found our catalyst to be especially useful when used in conjunction with a catalytic muffler such as just described.

Therefore, another embodiment of our invention is a catalytic muffler containing a catalyst especially adapted to substantially oxidize the unburned constituents of the exhaust gas of internal combustion engines, said catalyst comprising a support consisting, on a calcined basis, essentially of a calcined mixture of from about 5 to about 30 weight percent clay, from about 30 to about 70 weight percent alumina gel and the balance, crystalline alumina hydrate; from about 0.25 to about 15 weight percent copper in an oxide form and from about 0.01 to about 0.3 weight percent palladium. A more preferred embodiment of this part of the present invention is a catalytic muffler containing a catalyst, said catalyst comprising a support consisting, on a calcined basis, essentially of a calcined mixture of from about 8 to about 25 weight percent kaolin, from about 40 to about 60 weight percent alumina gel and the balance crystalline alumina hydrate; from about 0.5 to about 7 weight percent copper in an oxide form and from about 0.01 to about 0.2 weight percent palladium. A most preferred embodiment of the present invention is a catalytic muffler containing a stratified catalyst bed consisting of two catalyst layers; the first catalyst layer nearest the exhaust gas inlet comprising a support consisting, on a calcined basis, essentially of a calcined mixture of from about 8 to about 25 weight percent kaolin, from about 40 to about 60 weight percent alumina gel and the balance crystalline alumina hydrate; from about 0.25 to about 3 weight percent copper in an oxide form and from about 0.05 to about 0.3 weight percent palladium; and the second catalyst layer comprising a support consisting, on a calcined basis, of a calcined mixture of from about 8 to about 25 weight percent kaolin, from about 40 to about 60 weight percent alumina gel and the balance crystalline alumina hydrate; from about 3 to about 15 weight percent copper in an oxide form and from about 0.01 to about 0.05 weight percent palladium.

In another embodiment of the method of contacting the exhaust gas with catalyst the catalyst is contained in the engine exhaust manifold.

Having fully described the novel catalysts of the present invention, methods of preparing and using them and their utility, it is desired that this invention be limited only within the spirit and scope of the following claims.

We claim:
1. A catalyst especially adapted to substantially oxidize the unburned constituents of the exhaust gas of internal combustion engines, said catalyst consisting essentially of:
 (A) A support consisting, on a calcined basis, essentially of a calcined mixture of from about 5 to about 30 weight percent natural clay consisting essentially of alumina silicates, from about 30 to about 70 weight percent alumina gel and the balance, crystalline alumina hydrate, said mixture being calcined at a temperature of from 300–10000° F.,
 (B) From about 0.25 to about 15 weight percent copper in an oxide form, and
 (C) From about 0.01 to about 0.3 weight percent palladium.

2. The catalyst of claim 1 wherein said clay is kaolinitic.
3. The catalyst of claim 1 wherein said support consists, on a calcined basis, essentially of a calcined mixture of from about 8 to 25 weight percent kaolin, from about 30 to 70 weight percent alumina gel and the balance, crystalline alumina hydrate.
4. The catalyst of claim 1 wherein said support consists, on a calcined basis, essentially of a calcined mixture of from about 8 to 25 weight percent kaolin, from about 40 to about 60 weight percent alumina gel and the balance, crystalline alumina hydrate.
5. The catalyst of claim 4 containing from about 0.5 to about 7 weight percent copper in an oxide form and from about 0.01 to about 0.2 weight percent palladium.
6. The catalyst of claim 1 containing from about 0.5 to about 7 weight percent copper in an oxide form.
7. The catalyst of claim 1 wherein said support is in an extruded form.
8. The catalyst of claim 7 wherein said support has a surface area over 75 m.²/g.
9. A process for the manufacture of a catalyst especially suitable for the oxidation of hydrocarbon and carbon monoxide constituents of the exhaust gas of internal combustion engines, comprising the steps of mixing together natural clay consisting essentially of alumina silicates, alumina gel and crystalline alumina hydrate, in such quantities that the mixture consists, on a calcined basis, of from 5 to 30 weight percent clay, from 30 to 70 weight percent alumina gel and the balance, crystalline alumina hydrate; adding a copper compound in such quantity that the final catalyst contains from 0.25 to 15 weight percent copper in an oxide form, said copper compound being decomposable to copper oxide on heating; adding a palladium compound in such quantities that the final catalyst contains from 0.01 to 0.3 weight percent palladium; adding acid to plasticize the mixture; forming the plastic mass into a desired catalyst shape, and calcining the shaped catalyst at a temperature of from 300–1000° F.

10. A process for preparing an extruded catalyst, said catalyst being especially adapted to the oxidation of hydrocarbon and carbon monoxide constituents of the exhaust gas of internal combustion engines, said process comprising the steps of:
 (A) Mixing together, in a dry state, natural clay consisting essentially of alumina silicates, alumina gel and crystalline alumina hydrate in quantities such that the resultant mixture comprises, on a calcined basis, 5 to 30 weight percent clay, 30 to 70 weight percent alumina gel and the balance, crystalline alumina hydrate
 (B) Adding an amount of water sufficient to wet said mixture,
 (C) Adding sufficient acid to the wet mixture to form a plastic mass,
 (D) Extruding said plastic mass,
 (E) Drying the resultant extrudate,
 (F) Calcining said extrudate at a temperature of from 300–1000° F.,
 (G) Impregnating said calcined extrudate with a copper compound in quantities such that the final catalyst contains from 0.25 to 15 weight percent copper in an oxide form, said copper compound being decomposable to copper oxide on heating,
 (H) Calcining the resultant copper-impregnated extrudate at a temperature of from 300–1000° F.,
 (I) Further impregnating the resultant calcined copper-impregnated extrudate with palladium in quantities such that the final catalyst contains from 0.01 to 0.3 weight percent palladium, and
 (J) Drying the resultant copper oxide-palladium impregnated catalyst.

11. The process of claim 10 wherein said dry mixture of clay, alumina gel and crystalline alumina hydrate consists, on a calcined basis, of 8 to 25 weight percent kaolin, 40 to 60 weight percent alumina gel and the balance, crystalline alumina hydrate.
12. The process of claim 11 wherein said copper compound of Step G is copper ammonium carbonate.
13. The process of claim 11 wherein said copper compound of Step G is copper nitrate.
14. The process of claim 11 wherein said acid of Step C is nitric acid.
15. The process of claim 11 wherein there is present in the final catalyst from 0.5 to about 7 weight percent copper in an oxide form and from about 0.01 to about 0.2 weight percent palladium.
16. A process of preparing an extruded catalyst, said catalyst being especially adapted to the oxidation of hydrocarbon and carbon monoxide constituents of exhaust gas, said process comprising the steps of:
 (A) Mixing together, in the dry state, natural clay consisting essentially of alumina silicates, alumina gel and crystalline alumina hydrate in quantities such that the mixture comprises, on a calcined basis, from about 5 to about 30 weight percent clay, from about 30 to about 70 weight percent alumina gel and the balance, crystalline alumina hydrate,
 (B) Adding to said mixture a copper compound in quantities such that the final catalyst contains from 0.25 to 15 weight percent copper in an oxide form, said copper compound being decomposable to copper oxide on heating, (C) Adding an amount of water sufficient to wet the mixture,
(D) Adding sufficient acid to form a plastic doughy mass,
(E) Extruding said plastic mass,
(F) Drying the extrudate,
(G) Calcining said extrudate at a temperature of from 300–1000° F.,
(H) Further impregnating the calcined copper-impregnated extrudate with a palladium compound in quantities such that the final catalyst contains from 0.1 to 0.3 weight percent palladium, and
(I) Drying the copper oxide-palladium impregnated catalyst.

17. The process of claim 16 wherein said dry mixture of clay, alumina gel and crystalline alumina hydrate consists, on a calcined basis, of 8 to 25 weight percent kaolin, 40 to 60 weight percent alumina gel and the balance, crystalline alumina hydrate.

18. The process of claim 17 wherein said copper compound of Step B is copper oxide.

19. The process of claim 17 wherein said copper compound of Step B is a copper carbonate.

20. The process of claim 17 wherein said acid in Step D is nitric acid.

21. The process of claim 17 wherein there is present in the final catalyst from 0.5 to 7.0 weight percent copper in an oxide form and from about 0.01 to about 0.2 weight percent palladium.

References Cited

UNITED STATES PATENTS

| | | | |
|---|---|---|---|
| 2,967,185 | 1/1961 | Becker et al. | 252—450 X |
| 3,224,981 | 12/1965 | Stephens et al. | 252—460 |
| 3,235,512 | 2/1966 | Koepernik | 252—460 X |
| 3,310,366 | 3/1967 | Koepernik | 23—2 |

DANIEL E. WYMAN, *Primary Examiner.*

C. F. DEES, *Assistant Examiner.*

U.S. Cl. X.R.

23—2; 252—460

UNITED STATES PATENT OFFICE

CERTIFICATE OF CORRECTION

Patent No. 3,428,573                                        February 18, 1969

Ronald E. Reitmeier et al.

It is certified that error appears in the above identified patent and that said Letters Patent are hereby corrected as shown below:

Columns 17 and 18, TABLE 8, eight column, line 5 thereof, "709(495)" should read -- 790(495) --. Column 19, line 45, "300-10000° F" should read -- 300-1000° F --.

Signed and sealed this 31st day of March 1970.

(SEAL)
Attest:

Edward M. Fletcher, Jr.                                WILLIAM E. SCHUYLER, J1
Attesting Officer                                                 Commissioner of Patent: